United States Patent Office

PTO - BOYERS, PA Duty Station

MISSING PAGE TEMPORARY NOTICE

PATENT # X8133 FOR ISSUE DATE 4-3-1834

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing

Data Conversion Operation

Boyers, Pa

UNITED STATES PATENT OFFICE.

BEST AVAILABLE COPY 8,133-X

BEST AVAILABLE COPY

PERRY PRETTYMAN, OF GEORGETOWN, DELAWARE.

IMPROVEMENT IN HARROW-TEETH.

Specification forming part of Letters Patent, dated April 3, 1834.

*To all whom it may concern:*

Be it known that I, PERRY PRETTYMAN, of Georgetown, in the county of Sussex and State of Delaware, have invented a new and useful Improvement in Harrow-Teeth; and I do hereby declare that the following is a full and exact description of the construction and operation of said improvement as invented by me.

The teeth are to be made of iron or iron and steel, and the parts cast-iron in one solid piece, or wrought separately and afterward welded together.

First. The shank of the tooth in its general form is to be made flat, growing thicker in a small degree as it descends. The back is flat; also, the tenon is flat-sided and slightly gathered toward the front; but the front side, from the tenon downward, is rounded or beveled from the broad sides, so as to present an acute angle or cutting-edge in front, said edge beginning at the tenon, curving forward gradually at first, but more and more rapidly as it approaches the point where it joins the fluke, where it forms a continued curve with the ridge or angle made by the junction of the alæ, wings, or sides of the fluke. When cast, in order to strengthen the fluke a strong rib, in continuation, as it were, of the shank of the tooth, but rounded, is cast on the under side, in the angle formed by the wings, which rib must diminish regularly until it vanishes or subsides, just before reaching the extreme front point of the fluke. The breadth of the shank should be one and one-half inch or more, and its thickness five-eighths of an inch or more, these dimensions increasing slightly as it descends, its length, nine inches, including the tenon, which is five inches.

Second. The fluke consists of two cylindrical sections or surfaces (called above "sides" or "wings") standing at right angles, or nearly so, to each other on opposite sides of the shank, and reclining back and up toward the shank and under rib, (above described as cast with or on them,) so that the chord of the curve formed by their intersection shall have an inclination of about thirty-five degrees to the back or perpendicular line of the shank, the parallel sides, or, rather, upper and lower edges of the wings, at the same time making within about twenty degrees of a right angle with the back of the shank. The lower cylindrical surfaces of the wings are eccentric to the upper surfaces—that is, these surfaces approach each other as you descend from the upper edge toward the lower, meeting in the latter, and there forming a sharp cutting-edge the whole length of the bottom line. The outer edges of the wings are at right angles with the top and bottom edges, and the front corner beveled, so as to permit the earth to pass off the wing more freely and diminish the friction; also, the thickness of the wings at their center or point of intersection must be about double that of the thickness at the extremities, the object of which is to strengthen the fluke. Moreover, when the teeth are wrought the under rib already mentioned may be dispensed with by making the wings something thicker at the center.

The dimensions of the wings should be as follows: length of the lower edge, or from heel to point, about seven inches; of the upper edge, five inches; breadth of the wings, or length of the chord, about three and three-eighth inches; the versed sine, or depression of the center of the surface from said chord, about three-tenths of an inch. The chord of their intersection, when reclined as above directed, will be about four inches; the versed sine nearly the same as the last thickness of the wings at the junction, about three-quarters of an inch at the top edge. The outer extremity of the upper edge will then be about three-eighths of an inch. Although I have given these dimensions, I do not propose to confine myself to them or other dimensions herein given so rigidly as not to make slight variations, though they are not to be varied so as to interfere with the prominent shape and form of the teeth. The square tenon of the shank is mortised and keyed or wedged (from three to five of a row) perpendicularly in the ordinary harrow-frame, and so as to throw the sharp angle or edge of the shank and fluke directly to the front of the harrow; and the management is the same as of the

BEST AVAILABLE COPY
BEST AVAILABLE COPY ordinary harrow, only it will be found, in using this sort of teeth, they will enter with more ease and perform with far less labor than any heretofore in use.

What I claim as my invention is—

The peculiar form of the tooth herein described and made of wrought-iron, more especially the angle of inclination of the planes of the wings and of their edges to the shank, the sharp edge formed at their junction and continued up the shank, and the wings of the fluke being made at right angles to each other, or nearly so.

In testimony that the above is a true specification of my said improvement I have hereunto set my hand this 29th day of March, 1834.

PERRY PRETTYMAN.

Witnesses:
WM. Y. STEIGER,
S. MACDONALD.